United States Patent
Van Berkel et al.

(10) Patent No.: US 8,473,869 B2
(45) Date of Patent: Jun. 25, 2013

(54) TOUCHLESS MANIPULATION OF IMAGES FOR REGIONAL ENHANCEMENT

(75) Inventors: Cees Van Berkel, Hove (GB); Hugo Matthieu Visser, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1086 days.

(21) Appl. No.: 11/718,920

(22) PCT Filed: Nov. 9, 2005

(86) PCT No.: PCT/IB2005/053689
§ 371 (c)(1),
(2), (4) Date: May 9, 2007

(87) PCT Pub. No.: WO2006/054207
PCT Pub. Date: May 26, 2006

(65) Prior Publication Data
US 2007/0294639 A1   Dec. 20, 2007

(30) Foreign Application Priority Data
Nov. 16, 2004  (EP) ..................................... 04257105

(51) Int. Cl.
G06F 3/033    (2006.01)
G06F 3/048    (2006.01)
A61B 6/00     (2006.01)
G01N 23/00    (2006.01)
G21K 1/12     (2006.01)
H05G 1/60     (2006.01)

(52) U.S. Cl.
USPC ................................ 715/863; 715/764; 378/4

(58) Field of Classification Search
USPC .................................................. 715/764, 830
See application file for complete search history.

(56) References Cited

U.S. PATENT DOCUMENTS 5,542,039 A * 7/1996 Brinson et al. ................. 715/800
5,594,469 A * 1/1997 Freeman et al. ............... 345/158

(Continued)

FOREIGN PATENT DOCUMENTS

EP   1074939 A1   2/2001
EP   1256928 A2   11/2002

(Continued)

OTHER PUBLICATIONS

Jun Rekimoto "Gesture Wrist and Gesture Pad: Unobtrusive Wearable Interaction Devices", Wearable Computers, Proceedings Fifth Internantional Symposium, Oct. 2001, pp. 21-27.

(Continued)

*Primary Examiner* — Stephen Alvesteffer

(57) ABSTRACT

The invention provides a method and a system for manipulating an image displayed on a screen (11), where an operator uses e.g. a finger to identify a region of interest (ROI) without touching the screen (11). The spatial position of the finger relative to the screen (11) is detected, i.e. its x, y and z coordinates. A region of interest (ROI) on the screen (11) including the two coordinates (x, y) is selected, and an image property such as contrast in the selected region of interest is changed in dependence on the distance (z) of the movable object (13) from the screen (11). The invention is ideal for manipulating medical images such as X-ray images, but applications in consumer electronics are also conceivable where image processing is performed.

19 Claims, 2 Drawing Sheets

U.S. PATENT DOCUMENTS

Figure 1:
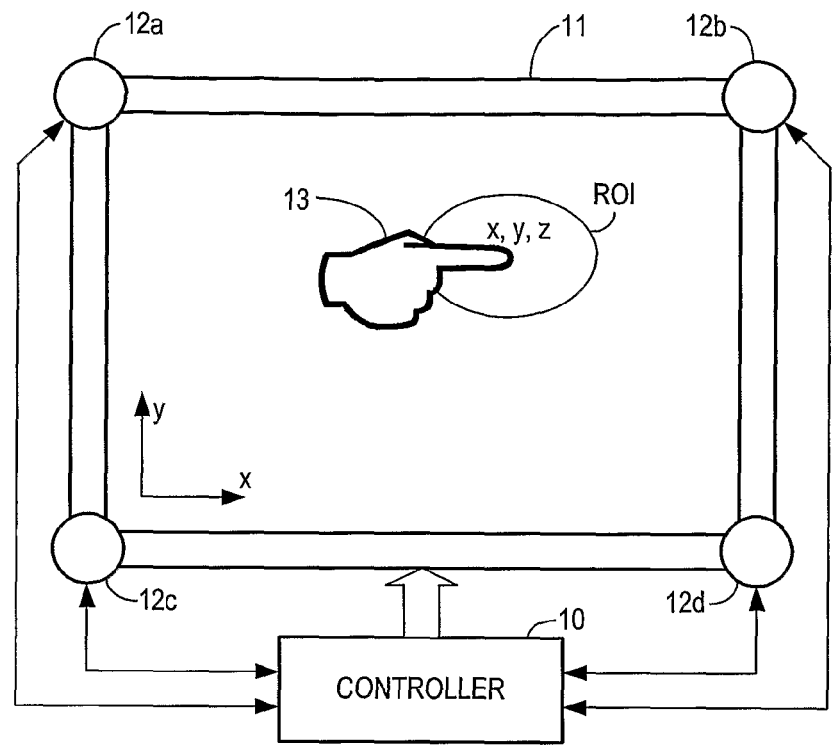

| | | | |
|---|---|---|---|
| 5,929,841 A * | 7/1999 | Fujii | 715/857 |
| 6,104,380 A * | 8/2000 | Stork et al. | 345/158 |
| 6,198,485 B1 | 3/2001 | Mack et al. | |
| 6,421,042 B1 * | 7/2002 | Omura et al. | 345/157 |
| 6,920,619 B1 * | 7/2005 | Milekic | 715/859 |
| 7,965,907 B2 * | 6/2011 | Takekoshi | 382/305 |
| 2001/0024213 A1 * | 9/2001 | Doi et al. | 345/863 |
| 2001/0055390 A1 * | 12/2001 | Hayashi et al. | 380/220 |
| 2002/0080172 A1 * | 6/2002 | Viertl | 345/751 |
| 2002/0180763 A1 | 12/2002 | Kung | |
| 2004/0021700 A1 * | 2/2004 | Iwema et al. | 345/863 |
| 2004/0193413 A1 * | 9/2004 | Wilson et al. | 704/243 |
| 2004/0242988 A1 * | 12/2004 | Niwa et al. | 600/407 |
| 2004/0246272 A1 * | 12/2004 | Ramian | 345/660 |
| 2005/0006154 A1 * | 1/2005 | Back et al. | 178/1 |
| 2005/0024325 A1 * | 2/2005 | Fleischmann et al. | 345/156 |
| 2005/0128181 A1 * | 6/2005 | Wang et al. | 345/156 |
| 2005/0197843 A1 * | 9/2005 | Faisman et al. | 704/276 |
| 2005/0210402 A1 * | 9/2005 | Gunn et al. | 715/773 |
| 2005/0289472 A1 * | 12/2005 | Morita et al. | 715/757 |
| 2006/0098873 A1 * | 5/2006 | Hildreth et al. | 382/181 |
| 2008/0288895 A1 * | 11/2008 | Hollemans et al. | 715/863 |

FOREIGN PATENT DOCUMENTS

| | | |
|---|---|---|
| EP | 1457863 A2 | 9/2004 |
| JP | 07271972 A | 10/1995 |
| JP | 08212005 A | 8/1996 |
| JP | 11065769 A | 9/1999 |
| WO | 0058933 A1 | 10/2000 |
| WO | 0113621 A2 | 2/2001 |
| WO | 03010486 A2 | 2/2003 |
| WO | 03073254 A2 | 9/2003 |
| WO | WO 03073254 A2 * | 9/2003 |

OTHER PUBLICATIONS

Cees Van Berkel, "55.1: 3D Touchless Display Interaction" SID Digest, vol. 33, No. 1, May 31, 2002, pp. 1410-1413.

\* cited by examiner

TOUCHLESS MANIPULATION OF IMAGES FOR REGIONAL ENHANCEMENT

The invention relates to the manipulation of images displayed on a screen for the purpose of enhancing an image property in a region of interest

BACKGROUND OF THE INVENTION

Medical images such as traditional X-ray images are often taken on sheets of photographic film, but CT (X-ray computed tomography), MRI (magnetic resonance imaging) and ultrasound images are most often displayed on a screen, since such images are computed images resulting from series of measurements. With the advent of digital X-ray detectors, radiology departments are making the transition to film-less hospitals. X-ray images are no longer taken and stored on film, but captured and stored digitally.

In many medical imaging techniques, but in particularly in X-ray, important anatomical features in the image can have very low contrast, compared to the overall image. This is due to the nature of the X-ray projection, in which all structures along the X-ray trajectory (i.e. from the X-ray tube to the X-ray film) are overlapped. To conserve the small contrasts, medical images from X-ray (but also from MRI, CT and other modalities) are captured and stored at up to 16 bit resolution.

Typically, the screens on which the images are viewed are capable only of 8 bit to 10 bits gray scale resolution. This is one of the reasons why traditional film, which can render high gray scale resolution, is still used in hospitals. The human eye is limited to approximately 1000 so-called just noticeable differences, corresponding to 10 bits. To fully exploit the high dynamic range of the data, a number of user interface strategies have been developed to benefit of the 14 bit gray scale on an 8 to 10 bit gray scale display. Such known methods include manually selecting a limited interval or window of gray scale values and expanding the values in the selected interval to the full gray scale capacity of the screen, whereby a dark interval and a light interval are clipped on the displayed image. Most common methods are based on mouse and keyboard interaction to adjust gamma or histogram distributions.

The problem with the methods used so far to visualize high bit depth on relatively low contrast display is that they do not encourage a natural exploration of the image material. Often the professional will suspect or know that a predetermined region of the image is of interest and it is desired to a locally enhance the contrast in the region of interest (ROI).

The invention provides a method and a system for manipulating an image displayed on a screen, where a movable object such as a hand or a finger of an operator is positioned relative to the screen, i.e. in front of the screen without touching the screen. The spatial position of the movable object relative to the screen is detected, i.e. its x, y, and z coordinates. A region of interest (ROI) on the screen including the two coordinates (x, y) is selected, and a property (e.g. contrast) of the image in the selected region of interest is changed in dependence on the distance (z) of the movable object from the screen.

Using e.g. a finger, the operator can point at the region of interest on the screen without touching the screen, and the system will then first detect the x and y coordinates of the finger, i.e. the point on the screen closest to the finger, and select a region around that point. Depending on the distance of the finger from the screen the contrast (or other image property) will change.

This is a more natural user interface for this particular problem. The interaction modality of the invention that responds to pointing to identify the region of interest and additionally provides input to determine the degree of local contrast enhancement is of great benefit.

The invention provides the use of touchless interaction (cross capacitance sensing, CCS) to create a local contrast enhancement dependent on hand or finger position in x, y and z position relative to the display. The x, y data is used to determine the center of the region in which the local contrast enhancement is made as well as the mean value. The z (zoom) position is used to determine the size of the region and the degree of enhancement.

According to the invention it is proposed to adjust the bitmap gray level to display gray level mapping (loosely called gamma curve) in a region of interest on the display. This adjustment will spread gray levels around an identified mean value. The position of the region and the value of the mean level are identified from x, y position coordinates and the size of the region as well as the degree of spread (the gamma) is determined by the z position. The invention can be used with any input system that provides x, y, z data but it is particularly advantageous to use the touchless cross capacitance sensing for local contrast enhancement, which results in an effective natural interaction and will be of great benefit particularly in medical applications. Touchless interaction based on cross capacitance sensing provides just such a modality. The cross capacitance sensing technology is described e.g. in WO 01/103621 and WO 03/010486.

Figure 2:
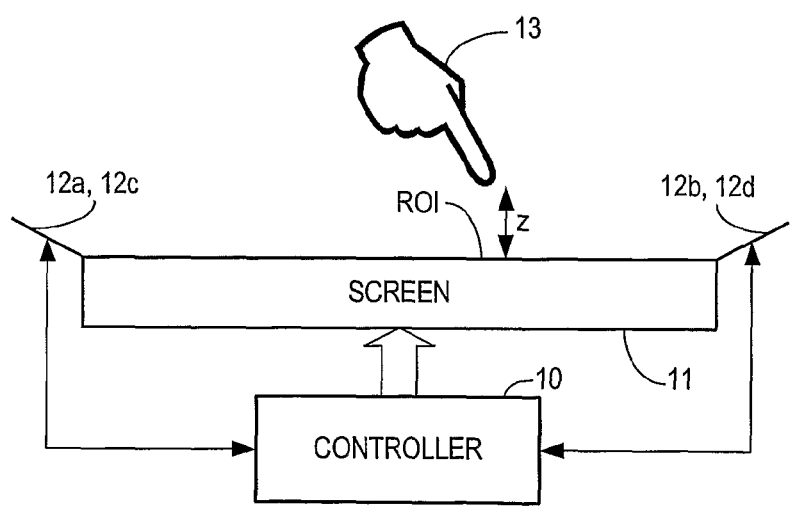
Figure 3:
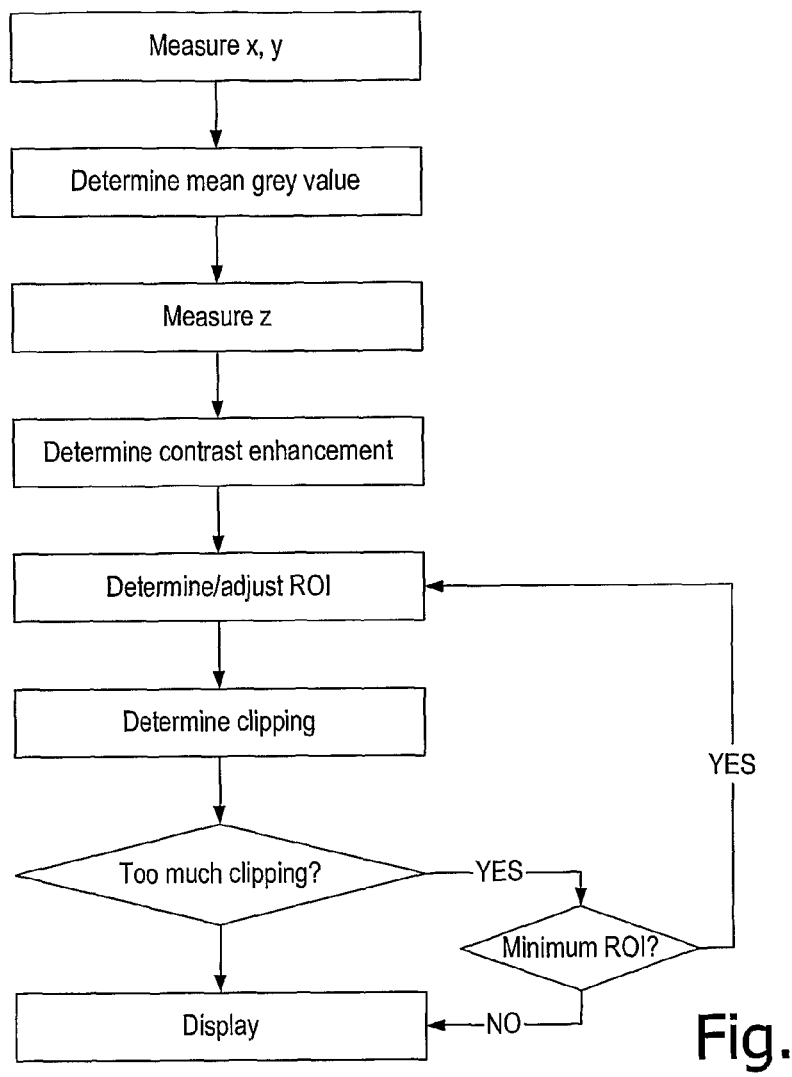
Figure 4:
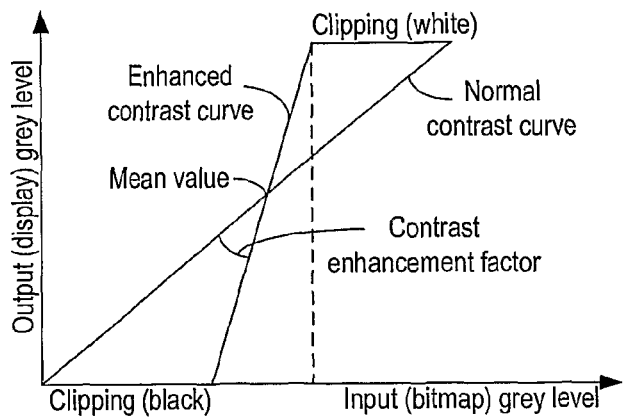

FIG. 1 shows a system schematically a system according to the invention for carrying out the method of the invention, FIG. 2 illustrates the principle of detecting the position of an object relative to the screen, FIG. 3 is a flow chart illustrating the method of the invention, and FIG. 4 shows graphically the contrast enhancement.

In FIG. 1 is shown a system according to the invention with a controller 10 connected to a screen 11. The controller comprises circuits including conventional hardware and software for displaying an image on the screen 11. The controller preferably receives the image as digital data. The image can be a monochrome (black-and-white) or a color image in any suitable data format. The controller outputs control signals to the screen 11 for displaying the image.

In connection with the screen there is a device for detecting the spatial position of a movable object relative to the screen. In the preferred embodiment this device comprises a set of electrodes 12a, 12b, 12c and 12d arranged at the edges of the screen. In the shown embodiment the electrodes 12a, 12b, 12c and 12d are arranged at respective corners of the screen. One or more of the electrodes are arranged as transmitters, and one or more of the remaining electrodes are arranges as receivers. An electrical signal such as 100 kHz, 3 Volt peak-to-peak is imposed on one or more of the transmitting electrodes, whereby a corresponding electric field is generated in the space in front of the screen.

When an operator of the system introduces a movable object such as a finger or a hand 13 into the electric field in front of the screen, the object will disturb the electric field, and the disturbance can be detected by the receiving electrodes. This is referred to as cross capacitance sensing. By properly arranging the electrodes relative to the screen, in particular the number of electrodes and their positions, and properly choosing the electric signals such as waveform, frequency, amplitude, sequential use of transmitting and receiving electrodes etc., it will be possible to detect not only the spatial 3-D position of the movable object relative to the screen but also movements and complex gestures of the hand 13 of an operator.

When e.g. a monochrome X-ray image is displayed on the screen, the operator may often wish to manipulate the image and enhance the image contrast in a region of interest. This is done as follows and as defined in the flow chart in FIG. 3. The operator first approaches a finger or other movable object to the region of interest ROI in the image displayed on the screen. When the finger enters the electric field the space in front of the screen, this will be detected by the controller. The controller measures x, y, z simultaneously but the method uses the x, y coordinates first to determine a mean value around which contrast enhancement should take place. This can either be the value of the pixel with coordinates x, y at which the user is actually pointing or a suitable average of over pixels in its vicinity. The method then uses the z value, i.e. the distance of the finger from the screen, to establish the amount of contrast enhancement to be applied. Typically this enhancement will be zero if z is above a certain threshold value, i.e. outside the space with the electrical field, and maximum below a threshold value, i.e. close to the screen.

Similarly the region will either be constant or maximal for z above a certain threshold value and constant or minimal for z below a threshold value.

The method then determines the amount of clipping and decides whether to reduce the region so that the amount of clipping can be reduced. The contrast enhancement is then applied and the image displayed. This is a dynamic process that is repeated as long as the presence of the movable object is detected in the electric field in front of the screen or is otherwise interrupted.

FIG. 4 illustrates the contrast enhancement. Shown on the horizontal axis is the input gray level of the digital image, i.e. bitmap, which will typically have a higher bit resolution than the display supports. On the vertical axis is plotted the output gray level of the display. For simplicity the normal contrast curve is assumed to be linear, and the effect of display gamma curve is ignored, which is an independent and additional mapping that takes place either before or after the mapping described here. FIG. 4 illustrates how the input to output mapping is enhanced around a 'mean' value by a contrast enhancement factor. The enhancement maps a smaller input range to a larger output range, but means that some input gray values are clipped to black or white output values. Preferably, these clipped input gray level values occur outside the region of interest, so that the entire region of interest will be contrast enhanced. It is possible to monitor how many pixels are clipped inside the region of interest and reduce the region of interest to minimize this. Another possibility is to use a smooth S-curve instead of the linear curve shown in FIG. 4.

The region of interest can have a predefined shape such as an ellipse as illustrated in FIG. 1 and a predefined size. However, by detecting the movements of the operator's finger, the operator may use his finger to "draw" the contour of an individual region of interest on the screen, or he may be given the choice between several standardized shapes and sizes.

Likewise, the operator may also be given the choice of image parameter to be changed, such as brightness whereby the bit map window on the horizontal axis is moved to the left or to the right.

The invention is described with reference to cross capacitance sensing of the movable object used for interacting with the screen. However, other contact free methods may also be used, such as optical sensing.

The invention is ideal for manipulating medical images but the invention may also be used for image processing in general.

The invention claimed is:

1. A method, comprising:
    displaying an X-ray computed tomography image on a screen with a first image contrast;
    positioning a movable object relative to the screen,
    detecting a spatial position of a movable object that does not touch the screen relative to the screen, where the spatial position includes two coordinates (x, y) on the screen and a distance (z) from the screen;
    selecting a region on the screen based, at least in part, on the spatial position of the movable object relative to the screen, where the region includes the two coordinates (x, y) and the X-ray computed tomography image;
    determining a second image contrast for the X-ray computed tomography image in the selected region in dependence on the distance (z) of the movable object from the screen, wherein the second image contrast is determined based, at least in part, on a mean value computed from the region; and
    displaying the X-ray computed tomography image with the second image contrast.

2. The method according to claim 1 wherein detecting the spatial position of the movable object that does not touch the screen relative to the screen comprises:
    generating an electric field in a space around the screen, and
    sensing changes in the electric field caused by the movable object when positioned in the electric field.

3. The method according to claim 1 wherein the region has a predetermined shape and a predetermined size.

4. The method according to claim 1 wherein the region has a shape and a size that are determined by an operator.

5. The method according to claim 1, where the property of the X-ray computed tomography image is image contrast enhancement, and the contrast enhancement is zero when the distance (z) is above a first predetermined threshold.

6. The method according to claim 5, wherein the contrast enhancement is maximum when the distance (z) is below a second predetermined threshold.

7. The method according to claim 6, further comprising:
    determining an amount of clipping; and
    determining whether to reduce the region on the screen to reduce clipping.

8. The method according to claim 1, further comprising:
    determining an amount of clipping; and
    determining whether to reduce the region on the screen to reduce clipping.

9. The method according to claim 8, further comprising: continually determining the amount of clipping as long as changes in the electric field caused by the movable object when positioned in the electric field are sensed.

10. The method according to claim 8, wherein the sensing includes contactless cross capacitance sensing of the movable object.

11. A system comprising:
    a screen that displays an image: and
    a controller, wherein the controller detects a spatial position of a movable object relative to the screen, the spatial position including two coordinates (x, y) on the screen and a distance (z) from the screen, where the distance (z) has an absolute value greater than zero;
    selects a region on the screen including the two coordinates (x, y) and the image, where selection is based, at least in part, on the spatial position of the movable object;
    changes a property of the image based, at least in part, on the distance (z) of the movable object from the screen; and changes a contrast enhancement property of the image based, at least in part, on the distance (z) of the movable object from the screen, where the contrast enhancement is minimum when the distance (z) is above a first predetermined threshold and where the contrast enhancement is maximum when the distance (z) is below a second predetermined threshold.

12. The system according to claim 11, where the controller, in connection with detecting the position further generates an electric field in a space around the screen, and senses changes in the electric field caused by the movable object when positioned in the electric field.

13. The system according to claim 11, where the region has a predetermined shape and size.

14. The system according to claim 11, where the region has a shape and a size that are determined by an operator.

15. The system according to claim 1, where the movable object is a hand or a finger of an operator.

16. The system of claim 11, where the image is an X-ray computed tomography image.

17. A non-transitory computer-readable medium containing computer executable instructions, that when executed on a computer, cause the computer to execute a method, the method comprising:
   sensing a change in a electric field in a space around a screen that displays an X-ray computed tomography image, where the change is caused by a moveable object entering the electric field;
   detecting a spatial position, including x, y, and z coordinates, of the movable object relative to a screen, where the moveable object does not touch the screen;
   identifying a region of interest on the screen based, at least in part, on the spatial position, where the region of interest includes the x coordinate, the y coordinate, and the an X-ray computed tomography image; and
   changing a contrast enhancement of the X-ray computed tomography image based, at least in part, on the z coordinate of the movable object from the screen, where the contrast enhancement is minimum when the z coordinate is above a first predetermined contrast level threshold and where the contrast enhancement is maximum when the z coordinate is below a second predetermined contrast level threshold.

18. The non-transitory computer-readable medium of claim 17, the method comprising:
   determining an amount of clipping for the X-ray computed tomography image with the region of interest;
   determining if the clipping is at an acceptable level;
   in response to the clipping being at the acceptable level, displaying the X-ray computed tomography image with the contrast enhancement; and
   in response to the clipping not being at the acceptable level, changing the region of interest on the screen and then repeating determining the amount of clipping for the X-ray computed tomography image with the region of interest and determining if the clipping is at an acceptable level and adjusting the region to balance clipping and degradation of image quality.

19. The non-transitory computer-readable medium of claim 18, the method comprising:
   determining an amount of clipping for the X-ray computed tomography image with the region of interest; determining if the clipping is at an acceptable level;
   in response to the clipping being at the acceptable level, displaying the X-ray computed tomography image with the contrast enhancement;
   in response to the clipping not being at the acceptable level, determining if the region of interest is at its minimum;
   in response to the region of interest being at its minimum, displaying the X-ray computed tomography image with the contrast enhancement;
   in response to the region of interest not being at its minimum, reducing the region of interest on the screen and then repeating the step of determining an amount of clipping for the X-ray computed tomography image with the region of interest and determining if the clipping is at an acceptable level.

* * * * *